Oct. 28, 1924.
A. MÉLOTTE
1,513,337
MEANS FOR ELECTRICALLY DRIVING THE BOWLS OF CENTRIFUGAL SEPARATORS
Filed Sept. 9, 1920
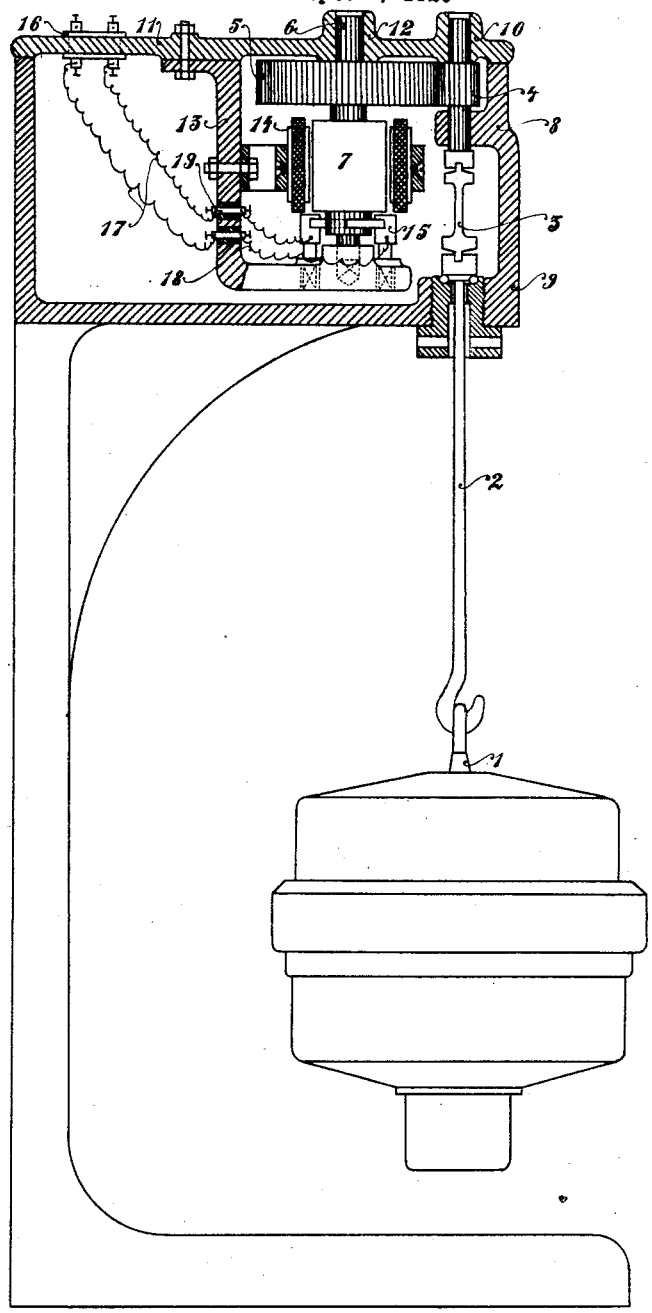
Inventor.
Alfred Mélotte,
By Watson, Coit, Morse & Grindle,
Attorneys.

Patented Oct. 28, 1924.

1,513,337

UNITED STATES PATENT OFFICE.

ALFRED MÉLOTTE, OF REMICOURT, BELGIUM.

MEANS FOR ELECTRICALLY DRIVING THE BOWLS OF CENTRIFUGAL SEPARATORS.

Application filed September 9, 1920. Serial No. 409,199.

*To all whom it may concern:*

Be it known that ALFRED MÉLOTTE, a subject of the King of Belgium, residing at Remicourt, Belgium, has invented certain new and useful Means for Electrically Driving the Bowls of Centrifugal Separators, of which the following is a specification.

The present invention has for its object means for electrically driving the freely-suspended bowls of centrifugal separators, by which means the electric motor is located, in an appropriate manner, in the head of the frame of the separator support.

By this invention the motor may be removed without disturbing the arrangement of the rest of the apparatus and is completely accessible after removal by detaching the cover of the housing constituting the head of the separator support.

The accompanying drawing represents, in part vertical section, a system of control according to the present invention, and shown applied to a cream separator.

The bowl 1 is suspended by an axis 2 which is journaled in an adjustable ball thrust bearing. This axis by a joint 3 is connected to a toothed pinion 4, to which a rapid rotation is imparted by a toothed wheel 5, whose axis 6 carries the armature 7 of the electric motor.

In the example represented, the vertical axis of the pinion 4 is supported by an arm 8 of the head 9 of the separator support, and may have a guide bearing 10 in the cover 11 of this head. Similarly, the vertical shaft 6 of the toothed wheel 5 is supported by an arm 13 consisting of an angle-member or bracket fixed to the cover 11 and the shaft 6 has a guide bearing 12 in the cover 11 of the housing 9.

The field-magnets 14 of the electric motor and also the brush-holders 15 are both fixed to the arm 13.

The current is led to the motor by means of the external terminals 16 and the conductors 17, 18. The terminals 16 can be fixed to the head 9 but are preferably attached to the cover 11, as shown. The conductors 17 connect the terminals 16 to the terminals 19 carried by the arm 13, whilst the conductors 18 connect these terminals to the brush-holder 15.

It is obvious that in the arrangement above described, it is sufficient to remove the cover and to detach the conductors 17 in order completely to remove from the head of the separator the electric motor with its supports without dismounting or dismantling the same.

Having fully described my invention, what I desire to claim and secure by Letters Patent is:—

1. In combination with an element to be rotated, a single support for the element comprising a housing, a removable cover for the housing, a bracket rigidly secured to the cover, a motor having a stationary member attached to the bracket and a rotatable member mounted between the bracket and the cover, a power transmitting member secured to the rotatable member of the motor, and a second power transmitting member mounted in the housing and connected to the element to be rotated.

2. In a centrifugal drum separator of the suspended electric-driven type in combination, a support, a housing at the top of said support, a removable cover upon said housing, a removable bracket fixed to said cover inside the housing, a bearing in said cover, a second bearing in said bracket, a rotor shaft mounted in said bearings, a gear wheel mounted upon said rotor shaft, a stator, brush-holders and clamps mounted upon said bracket and suitable gear-and-link connection, supported by the housing, between said gear wheel and a drum spindle.

3. In a centrifugal drum separator of the suspended electric-driven type, in combination, a support, a housing at the top of said support, a removable cover upon said housing, a removable bracket fixed to said cover inside the housing, a bearing in said cover, a second bearing in said bracket, a rotor shaft mounted in said bearings, a gear wheel mounted upon said rotor shaft, a stator, brush-holders and clamps mounted upon said bracket, a shaft rotatably mounted between the cover and a projection of the housing, a pinion upon said shaft meshing with said gear wheel upon the rotor shaft, an adjustable and removable ball thrust bearing beneath said pinion shaft, a drum spindle rotatably suspended within said ball thrust bearing, and a link member connecting said pinion shaft to said drum spindle.

A. MÉLOTTE.